March 18, 1958 H. H. SAPPEY ET AL 2,826,814
REMOVABLE DENTAL BRIDGE
Filed Nov. 21, 1952
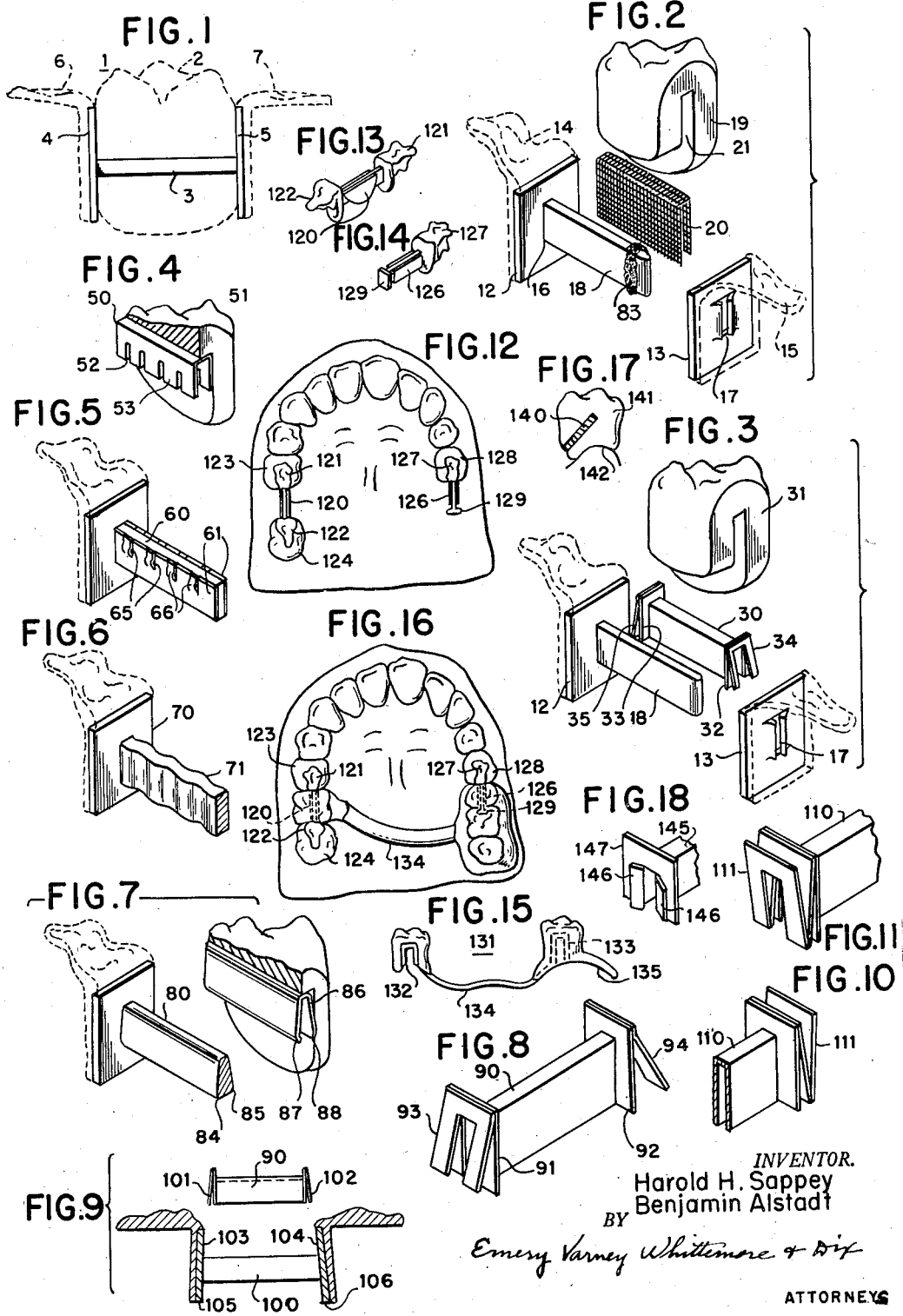
INVENTOR.
Harold H. Sappey
Benjamin Alstadt
BY Emery Varney Whittemore & Dix
ATTORNEYS

United States Patent Office 2,826,814
Patented Mar. 18, 1958

2,826,814

REMOVABLE DENTAL BRIDGE

Harold H. Sappey, Kew Gardens, and Benjamin Alstadt, New York, N. Y.

Application November 21, 1952, Serial No. 321,768

8 Claims. (Cl. 32—5)

This invention relates to dentistry, and more in particular to bridgework for the replacement of teeth for those that have been lost or removed. This improved invention also pertains particularly to the field of preparing and properly installing bridgework to permit the replacement teeth to be readily removed and replaced by the user.

This application is a continuation-in-part of our prior filed application, Serial No. 243,028, filed August 22, 1951, and is directed to the component parts that enter into the making of a complete dental bridge for removable pontics, and is directed to their construction, to their assemblage as a commercially available package before use, to their assemblage into an operating combination for use, and to the various methods or steps required to make and assemble those component parts.

One object of this invention is to provide a series of component parts to be assembled as desired, for a removable dental bridge, which series shall be available as a commercial package to a dentist, upon selection of the components to a size and type to fit the space dimensions and location of a pontic space to be equipped by the final bridge.

Another of the objects of this invention is to provide a removable dental bridge which shall be of an external removable type with the supporting parts disposed outside of the outlines of the supporting abutment teeth, as distinguished from the internal removable types of the prior art, where the female receiving and supporting parts are disposed within the contour outlines of the tooth structures.

Another object of this invention is to provide a removable bridge structure in which the abutment teeth are maintained always in constant relationship to maintain the normal shape of the dental arch.

Another object of this invention is to provide a removable bridge structure with fixed abutments that are completely closed, so no cavities will be present to collect food and debris.

Another object of this invention is to provide a removable bridge structure that shall be relatively simple and economical to make and to install in a patient's mouth, and that will obviate the need for the extravagant expenditure of time, skill and effort, as heretofore required in connection with the conventional paralleling operations.

Another object of this invention is to provide a novel structural support for a removable dental bridge, which will permit a removable pontic element to be easily and readily applied and inserted in operating position, and permit that element to be easily and readily moved when desired, and to form a satisfactory interlocking between the support and the removable element so that there will be proper and satisfactory holding of the removable element during mastication.

Another object of this invention is to provide a supporting structure for a removable dental bridge, in which the supporting structure is disposed externally of the abutment teeth, so free access may be had to the supporting structure for sanitary purposes.

Another object of this invention is to provide a novel construction for a removable dental bridge, whose separate components may be manufactured as integrated complete units and by quantity production methods, in order to make available to the dentist inexpensive and expertly formed and partly or completely pre-assembled co-fitting components, that may now as a single unit, be easily and accurately related to the abutments, to form the dental bridge, with a fixed element for proper fit between abutment teeth and with a removable element to be supported thereon.

In the practice of this invention, the dental bridge structure contemplated herein includes a rigid fixed supporting structure, including a fixed support generally in the form of a beam, to be disposed between two spaced abutment teeth, and a removable pontic structure of one or more teeth to be removably fitted onto that fixed beam support. The beam, thus considered, includes the bar and two respective end plates.

The two end plates, or equivalent abutments, serve for anchorage on the abutments of the abutment teeth. The bar may take various forms, but is herein described principally as being of rectangular cross-section with a deep vertical dimension for maximum strength and rigidity. The bar serves to receive and to support the removable pontic element of the bridge.

The removable pontic element generally comprises a gripping member, generally shaped as a channel section, to fit slidingly onto the bar with a relatively tight fit. Suitable resilient elements may be added, on the bar or on the gripping member, respectively. Those resilient elements may be made in various forms or constructions, to permit a small amount of self-adjusting movement of either member to enable the pontic to be fairly easily applied to or removed from the bar, and to increase the frictional gripping effect to hold the removable gripping member in place when applied on the fixed bar.

The construction of a dental bridge, including a removable pontic, made in accordance with the present invention, is illustrated in the accompanying drawings, in which:

Fig. 1 is a schematic side view of a pontic bridge support of H-shape, illustrating a feature of construction of this invention;

Fig. 2 is an exploded view of one form of assembly, as disclosed in the prior application directed to the fixed form of dental bridge;

Fig. 3 is an exploded view of an assembly to be used in constructing removable dental bridge, and including a channel element that serves as a removable gripping fitting to support the removable pontic;

Fig. 4 is a perspective view of a channel element of comb-shape to embody a series of individually adjustable resilient tangs for gripping the supporting bar of the fixed structure;

Fig. 5 is a perspective view of a modified form of supporting bar provided with a comb-shaped apron having separate resilient tangs for gripping a channel element of the removable pontic;

Fig. 6 is a perspective view of a further modification of the fixed supporting bar, shaped to embody a corrugated side wall contour for use with a removable channel supporting a removable pontic;

Fig. 7 is a front elevational view of a modified form of a fixed supporting bar structure, to illustrate a bar with a diverging downward taper for receiving a modified form of spring-biased channel as shown in Fig. 8;

Fig. 8 is a perspective view of a channel to serve as the removable element for supporting the removable pontic, and illustrates the disposition of end-biasing springs on the channel to assist in anchoring the channel on the supporting bar, by increased end-pressure against the end plates on the bar;

Fig. 9 is a front elevational view of a bridge between two abutments, with the channel of Fig. 8 shown above the supporting bar onto which it is to fit;

Fig. 10 is a perspective view of one end of the channel member similar to that in Fig. 8, but provided with an additional spring leaf for added resilient pressure against the end plates of the bar;

Fig. 11 is a perspective view of the end spring showing the spring at the other end of the channel in Fig. 10;

Fig. 12 is a palatal view of an upper arch, showing the location of a bridge between two abutments for the first molar on one side of the arch and a cantilever support for first and second molars on the other side of the arch;

Figs. 13 and 14 are, respectively, perspective views of the fixed bar with double abutment supports, and of the fixed bar supported as a cantilever on a single abutment, as used in Fig. 12;

Fig. 15 is a front elevational view of an assembly including a palatal bar for joining two channel members to be respectively fitted over the fixed beam and over the cantilever beam shown in the arch structure in Fig. 12;

Fig. 16 is a palatal view similar to Fig. 12 showing the manner in which the integrated removable bridge element of Fig. 15 is disposed to fit on the fixed bars of the upper arch to position that removable element on these fixed bar elements;

Fig. 17 is a schematic view of a bar supported with its major axis in inclined position, with a pontic thereon shaped with its under surface to fit the gum ridge; and Fig. 18 is a perspective view of a modified form of a removable channel, resilient end leaves, supported about vertical axes, to frictionally engage the end plates of the bar.

This invention has, as a basic feature, a structure of H-shape, as schematically shown in Fig. 1, to provide a strong simple bridge to support a removable tooth or pontic 2 horizontally and laterally schematically indicated in dotted outline. The tooth is supported on a bar 3, with two end plates 4 and 5 that are to be secured to and supported by the respective abutments 6 and 7 in the abutment teeth. The horizontal bar with its end plates 4 and 5 serves to connect the abutments in a rigid structure and to support the removable replacement tooth or pontic 2.

In the previous application, the combination employed for the fixed bridge construction comprised the elements shown in Fig. 2.

As shown in Fig. 2, the fixed bridge construction comprises two end plates 12 and 13 for anchorage on two opposite abutments 14 and 15 that are to be cast to fit the abutment teeth for the bridge. The end plates 12 and 13 are respectively provided with central windows 16 and 17 to receive and accommodate the ends of a bar 18 to support the pontic 19. A mesh screen 20 is included to fit over the bar 18 and fit within a slot 21 in the pontic 19. The end plates 12 and 13 are shown provided with guide lugs at the sides of the windows 16 and 17 to cooperate with the top and bottom edges of the associated windows to hold the end plates 12 and 13 perpendicular to the bar 18 and parallel to each other, throughout any movement of the end plates on the bar, in adjusting the spacing between the end plates.

In the preparation of the wax patterns for the abutment castings, the end plates 12 and 13 are appropriately disposed and mounted on the wax patterns from which the inlay abutments are to be cast, and the ends of the bar will extend through the windows of the end plates and be embedded in the wax patterns. The bar ends and the areas on the end plates immediately adjacent the windows, including the lug edges and surfaces, are preferably covered with solder 83, so the bar can be easily and readily anchored in selected adjusted position on the end plates, by the application of a localized heat effect, either electrically or by a sharp flame, for the soldering operation.

The abutments 14 and 15 may then be joined onto the end plates and bar ends by casting operation, or by a soldering process, to form the bridge into a rigid structure, ready to receive the pontic.

The maintenance of the parallel relationship between the two end plates assures a clean sliding fit for the removable pontic 19, whose mesial and distal walls are planar and parallel, and have a spacing or width dimension to which the end plates were correspondingly adjusted for final positioning on the bar 18.

In the present arrangement, provided for removable pontic, as shown in Fig. 3, the same two end plates 12 and 13, or equivalents, may be employed to be anchored on the respective associated abutments 14 and 15, and a bar 18 of rectangular section may be arranged to be supported between the two end plates 12 and 13. These two end plates and the bar will be fitted to the tooth abutments to constitute a rigid and fixed support for the removable pontic or pontic structure, which latter may consist of one or more pontic or tooth elements.

The fixed structure, of bar and end plates, may be made of separate individual elements, as in Fig. 3, which may be assembled and integrated, by the dentist or by the dental assistant, upon suitable wax impressions of the abutment cavities assembled on a conventional stone model.

Preferably, however, it is one of the important features of this invention, that the entire supporting structure including the bar and its two end plates will be manufactured as a completely finished item, as an article of commerce, in graded sizes and of suitable dimensions, to accommodate one or more pontics. Such finished supporting structures, of H-shape, as shown in Fig. 1, can thus be formed as rigid units with an overall length that may be selected by the dentist, as needed, to fit the space between the two abutment teeth that are to support the bridge.

Of similar importance is the provision of the removable element, herein referred to as the channel element that carries the pontic tooth or teeth. Thus, the supporting structure, of bar and end-plates, and its conjugate co-fitting channel, will be made as two related and mated members of graded sizes to be available as manufactured components for the dentist.

The pontic or tooth, itself may be secured to the removable channel element as a manufactured subassembly, or the dentist or dental assistant may combine the tooth and its channel carrier into an integrated component.

The pontic may be of any suitable type and material, such as plastic, ceramic or metal, for example. Any such tooth, provided as a separate element, need merely be provided with a mesio-distal slot to permit fitting the tooth over the removable channel and then securing the tooth to the channel. Thus, a gold tooth, for example, could provide a hard occlusal surface and serve as a support for a ceramic facing portion.

In either case, the provision of manufactured structural supports of bar and end plates, and their related conjugate mated removable channel elements, as finished component parts, readily available to the dentist, immediately lowers the heretofore high cost of making a dental bridge by conventional expensive time-consuming methods.

Moreover, considerable flexibility is available to the dentist or to the dental technician in fitting such preformed manufactured parts to the pontic spaces to be filled. Thus, for example, the supporting bars of two adjacent sizes in a set of graded dimensions may be of slight difference, yet the unit of either dimension could be utilized by appropriate variation in the dressing of the wax impressions during the adjustable pre-fitting of the unit onto the wax impressions to be used for casting the abutments. Thus, a supporting structure with a bar of one size or length, may be adequate to take care of spaces of slightly different dimensions, within a limited range, between abutment teeth.

In Fig. 3, the elements of a removable pontic structure are shown as elements to be assembled by the dentist. As previously indicated, however, a finished H-shape structure, as in Fig. 1, will preferably be provided as a component in a packaged assemblage of all elements required to make the complete removable bridge. Included will be a channel-shaped member 30 for supporting one or more pontics, or teeth. Only one pontic 31 is illustrated, in Fig. 3, for the purpose of the present showing. The pontic 31 may be secured to the channel 30 by suitable means, which may include a mesh reinforcement such as mesh 20, of Fig. 2, plus the proper cement to anchor the pontic 31 to the mesh. Also, other arrangements may be employed to anchor the pontic to the channel, as by preparing the channel made to receive some of the cement as locking keys, with or without similar cavities in the adjacent walls of the pontic, or with anchored inserts in the pontic to grip the cement.

The channel member 30 is preferably formed to have a certain amount of resiliency in the two side walls, and the spacing between those walls should be such as to cause the channel member 30 to fit slidingly and snugly over the supporting bar 18 when the channel with its supported pontic is applied for use.

In order to provide maximum resiliency and tightness to the channel element for gripping the bar, a suitable constraining force is arranged to be applied, at least to each end of the channel member 30, by means of inverted U-shaped plates 32. The constraining plates 32 normally fit snugly over the channel 30 and tend to hold the sides of the channel to a spacing that will cause the channel to fit snugly and tightly onto the supporting bar when applied thereto. Any slight distention or separation of the channel walls will generate a resisting reaction force, in the constraining plates 32, which will tend to reinforce the frictional gripping action of the side walls of the channel 30 against the supporting bar 18.

In order to provide additional functional constraint of the removable pontic, on the bar, the constraining plates 32 and 33 are each shown provided with a cooperating pressure leaf 34 and 35, respectively. Each constraining plate 32 and 33, with its associated leaf 34 or 35, is constructed to embody inherent resilience tending to cause divergence between the plate and its associated leaf.

The tendency of each leaf 34 or 35 to diverge from its associated constraining plate 32 or 33 at the end of the channel 30 is utilized to create a reaction pressure force against the associated end plate or abutment. Since the two end plates 12 and 13 or abutments 14 and 15 are rigidly mechanically joined to the connecting bar, the reaction pressure forces of the two leaf springs 34 and 35 against the end plates is balanced out or absorbed by the bar, so that no lateral stresses are impressed on the abutment teeth themselves.

Thus, the removable pontic element is securely held in position on the bar, against casual displacement by normal masticating forces.

In order to achieve the tight gripping action desired between the removable channel member which supports the pontic and the fixed supporting bar, various modifications may be made in the structural design or form of either the channel member or the bar, or both.

A few modifications are shown by way of illustration, but without necessarily limiting the modifications to those that are here illustrated.

In Fig. 4 is shown a modified form of channel 50 which supports a removable tooth or pontic 51. The channel is shown with its two sides or webs slotted with spaced vertical slots 52, along the length of the channel, to a height less than the full height of the channel sidewalls. Such construction provides a relatively tight fit over the supporting bar on which the channel 50 will be disposed. At the same time, the separated tangs 53 of the two side walls of the channel will be free to adjust themselves according to their respective internal stresses, and according to any possible slight irregularities in the flatness of the supporting bar, so that each tang 53 will be free to grip the bar with maximum force independently of the action of its neighboring tangs.

Similarly, as shown in Fig. 5, the supporting bar or beam 60 may be provided with a leaf spring 61 on one side of the bar, or with a similar spring on each side of the bar 60, to provide a resilient member which will serve to augment the normal frictional gripping force which the bar alone would experience from the removable channel member. Here, the resilient spring element 61 is secured along its one edge to the bar 60, and the other edge of the resilient element is normally slightly spaced from the surface of the bar, in accordance with a slight pre-stressed biasing force. The lower longitudinal edge of the leaf spring 61 is continuous, and the upper longitudinal portion is vertically slotted, as indicated, with slots 65, to provide individual separate tangs 66. When a channel member is placed down over the modified bar of the type shown in Fig. 5, the individual tangs 66 will be free to adjust themselves to establish their maximum respective pressure forces against the internal surfaces of the side walls of the channel member.

After use, the tangs may be spread from the bar, if necessary, to restore a resilient disposition to the tangs. A continuous unslotted spring strip, if used instead of the slotted spring element, could similarly be spread from the bar, if necessary, to restore a lost or diminished condition of resiliency.

In Fig. 6 is shown a further modification of the bar or beam to provide a bar 70 having its side surfaces slightly corrugated transversely of the bar length. The several corrugations 71 may be of two types. In one type they may be of sufficient depth to serve as guides and locking keys for correspondingly formed corrugations on the inner surfaces of the associated channel that is to be used with this bar. In a second form, the corrugations 71 may be quite shallow and serve merely as high spots against which the channel walls will be caused to become slightly deformed in order to establish an increased tight pressure force between the channel and the bar, to increase the gripping action between them.

In Fig. 7, still another form of bar 80 is illustrated, consisting generally of a bar having a slightly diverging taper downwardly, with curved lower edges 84 and 85, to permit the use of an associated channel member 86 formed to have the lower edges of its side walls turned inwardly and disposed to have a slight amount of resilient self-adjustment to enable the channel member 86 to fit down over the tapered bar 80 and then grip the bar by the lower edges 87 and 88 of the channel moving inwardly to engage the corner edges 84 and 85 of the bar, after the channel member 86 has been fitted and pressed home over the supporting bar 80.

In Fig. 8 is shown a form of channel 90 which is provided with the basic constraining end elements 91 and 92 that impose a fixed biasing pressure force on the channel 90. In order to add an endwise gripping force to hold the channel against displacement on or from the bar, two additional and auxiliary resilient end elements 93 and 94 are provided. These auxiliary elements 93 and 94 are arranged to be anchored along one edge, either the top or the bottom edge of the channel elements 91 and 92, respectively. In either case, when the channel member 90 is pressed downwardly on its cooperating supporting bar, the auxiliary spring elements 93 and 94 will be effective endwise to press against the adjacent side surfaces of the corresponding end plates on the bar.

In Fig. 9 is shown schematically one arrangement whereby the channel 90 of Fig. 8 may be utilized. The channel is to be disposed on a supporting bar 100 in such manner as to permit the two auxiliary leaf springs 101 and 102 to move axially outward against the adjacent surfaces 103 and 104 of the respective end plates 105 and 106 that are integral with the abutments that support the bar 100. The extended disposition of the spring leaves 101 and 102 against those two side surfaces 103 and 104, of the end plates, provides a reaction pressure with a downward component tending to hold the channel 90 on the bar 100 and also provides an additional friction force against casual movement of the channel on the beam in response to forces generated during mastication.

In Fig. 10 is shown a further modification of the channel of Fig. 8. Instead of single spring elements being used as shown in Fig. 8, folded spring elements 111 are used to the end spring structure on the channel 110 is substantially of N-shape, as distinguished from the V-shape of the form shown in Fig. 8.

The construction illustrated herein lends itself flexibly to various arrangements for supporting removable bridges on different parts of the dental arch.

Figs. 12 to 16 illustrate the manner in which the present construction may be readily adapted to provide a removable bridge for pontics to replace molars on both sides of a dental arch. In the figures referred to, the example illustrated is shown applied to the upper arch, from which the first molar is missing on one side of the arch, and both molars are missing on the other side of the arch.

As shown in Fig. 12, where the first molar is missing, a fixed bridge supporting bar 120 is disposed in fixed position between two abutments 121 and 122 in their respective abutment teeth 123 and 124.

On the other side of the arch, where only the second molar is missing, a supporting bar 126 is mounted, as a cantilever beam, on one abutment 127 on the front molar 128. The free end 129 of the beam 126 is provided as an enlarged end piece to hold the companion channel in position against longitudinal displacement from the beam 126.

Fig. 13 shows a perspective view of the fixed supporting bar mounted and held between the two abutments 121 and 122. The lower edge of the bar 120 is shown downwardly curved to accommodate itself as closely as desired to the gum line between the teeth, while allowing sufficient clearance between the lower edge of the bar 120 and the gum line for sanitary cleaning operation.

In Fig. 14 is shown a perspective view of the cantilever beam 126 which is shown supported at one end from the abutment 127. The beam 126 is shown provided with an enlarged end 129 to retain the channel against endwise displacement when the removable channel element is in place. The beam 126 is illustrated as embodying an auxiliary resilient spring element extending the length of the bar to increase the frictional pressure against the removable channel member.

Fig. 15 is a front elevational view of the removable member 131 of the bridge and is shown comprising a channel member 132 and a channel member 133 that are integrally joined by a palatal bar 134 to constitute a rigid unitary member. The channel 132 is prepared to fit over the fixed beam 120, and the channel 133 is prepared to fit over the cantilever beam 126. In order to provide additional support for the channel 133, beyond the cantilever beam 126, an outer bearing for the channel 133 is provided as a saddle 135 of suitable dental plastic material. That saddle 135 is mounted on the channel 133 and is appropriately shaped on its under surface to the gum lines of the patient, so the saddle will rest comfortably, and, at the same time, provide support for the outer end of the channel 133, to prevent excessive bending torque by the cantilever beam 126 on its single tooth abutment.

When the removable bridge member 131 is restored, the two channels 132 and 133 will respectively rest snugly on their associated beams 120 and 126, and the palatal bar 134 will just engage the palate, as in Fig. 16.

As indicated in the descriptions of the various forms of the fixed supporting bar and of the removable channel, the various modifications of the bar and of the channel may be combined in any desired appropriate arrangement.

While most of the figures show the bar disposed vertically, it should be understood that the bar may be disposed in other positions. For example, for illustration, Fig. 17 shows schematically a bar 140 tilted forwardly to receive a pontic 141 secured on a channel (not shown) at a corresponding angle, so the pontic can be applied to the bar with a backward and downward movement. The bottom of the pontic can be appropriately shaped to fit the gum line 142 when pressed "home" onto the supporting bar. This arrangement provides the feature of increased projected area of support for the occlusal surface of the pontic. Thus, the invention contemplates various bar structures and dispositions, as conditions may indicate.

Similarly, the structures of the removable element are intended to include resilient gripping and frictional elements, irrespective of their form. As an example, the removable channel 145 in Fig. 18 is shown, schematically, with resilient friction leaves 146 at each end, only one end being shown, to engage the end plates of the associated bar, such as end plates 12 and 13 in Fig. 3. In this illustrative modification, in Fig. 18, the leaves 146 are shown supported to flex about their vertical axes as distinguished from the flexing about a horizontal axis shown in the structures of Figs. 8, 10 and 11.

The leaves 146 may be formed as part of and continuations of the side walls of the channel, or the leaves may be formed as part of the constraining plate 147 which is mounted astride the channel to provide the lateral compression force to hold the removable channel member tightly against its supporting bar. In such case the flexing leaves 146 may be of the same height as the constraining bar 147 and may be formed in various ways, either as separate elements joined to the constraining plate, or as elements folded back from the material of the plate itself in order to provide the resilient leaf elements that will press against the end plates 12 and 13 on the bar. In either case, the constraining plate 147 will be secured to the walls of the channel 145 in a manner similar to the fastening of the end plates 91 and 92 to their corresponding channel 90 in Fig. 8.

It is to be understood, of course, that the side walls of the pontic element, such as 31 in Fig. 3, will be suitably provided with a small depression or recess that may be needed to accommodate the constraining plates 147 at the end of the channel.

The dimensions of the abutments may be varied slightly to make their inwardly projecting faces either slightly more extending, or slightly more retracted. Therefore, a single fixed beam unit, with its bar and integral end plates, as shown in Fig. 1, may be employed to bridge pontic spaces that may vary over a narrow range of dimensions. The compensation to accommodate the fixed bridge element of definite dimensions is provided by slightly varying the pontic space dimensions of the abutments, to extend further into the pontic space, or less, as may be necessary to accommodate the selected or available bar.

This arrangement provides considerable flexibility, both in the utilization of commercially preformed bridge structures, and in the ultimate application of the bridge structure to the abutment teeth in the patient's mouth.

This invention thus provides a simple and economical system, and method for commercially providing preformed components, as articles of manufacture, for selection to fit specific requirements, and to be available for simple and easy assemblage by a dentist, to make a removable dental bridge.

A feature of the invention is the bar and the end plates as an integral unit, whereby the end plates provide substantial areas to permit ready application to the abutments of the abutment teeth. A particular advantage of this feature is that the area of the end plate permits easier soldering of the end plates to the abutment surfaces, where the beam may be joined to the abutments individually, on a suitable stone model.

The provision of the channel element with side pressure elements and with end pressure elements assures tight frictional fitting of the channel onto the bar while permitting ready release and removal by the wearer, when desired.

Thus, for example, the reaction pressure of the end plates 103 and 104 of the bar 100, in Fig. 9, against the friction leaves 101 and 102 on the channel 90 causes slight distortion or buckling of the constraining element 91 that straddles the channel, as in Fig. 8, with a resulting side pressure against the channel sides. The end pressure against the channel is thus translated and converted into a compression side pressure against the channel to increase the tight grip of the channel against the bar.

It will be understood that various modifications and changes may be made in the preferred form of the invention herein, and such modifications and changes are to be understood as part of this invention, as outlined in the following claims.

The invention claimed is:

1. A dental bridge for a removable pontic, comprising a beam of rectangular cross-section with the long dimension vertical, two parallel end plates, one at each end of the beam, the beam and the two end plates being adapted to be secured to and supported in fixed position between two otherwise prepared abutments as a carrying bar for a pontic, and an attachment embodying a channel-shaped element frictionally fitting over the beam, the attachment serving to support a pontic, and being removable from the beam.

2. A dental bridge as in claim 1, in which the channel-shaped element embodies resilient pressure-biassing means to increase the gripping action of the attachment onto the beam.

3. A dental bridge as in claim 2, in which the channel element also embodies resilient pressure-biassing means to frictionally engage the end plates at the end of the beam.

4. A removable pontic support for use on a supporting bar of a bridge, comprising a channel element with resilient side walls that are slit to provide tangs for gripping the supporting bar.

5. A supporting bar for a dental bridge, comprising a resilient strip transversely slit to embody a plurality of tangs to grip an applied pontic support.

6. A dental bridge comprising a supporting bar, and a channel element frictionally fitting onto and removable from the bar, one of said elements having slit independent tangs to frictionally grip the other element.

7. A dental bridge comprising a bar with transverse end plates, and a removable pontic support consisting of a channel element having resilient end leaves serving to tightly frictionally engage the end plates of the bar to establish a tight frictional retaining pressure force on the channel member.

8. A dental bridge comprising a supporting bar with transverse end plates, and a removable channel fitting over the bar, said channel having a transverse constraining element and end-pressure leaves pressing against the bar end plates and translating said longitudinal end thrust reaction pressure into a transverse compression on the two side walls of the channel to increase the pressure of the channel against the bar.

References Cited in the file of this patent

UNITED STATES PATENTS

| | | |
|---|---|---|
| 1,324,476 | Supplee | Dec. 9, 1919 |
| 2,573,804 | Neustadter | Nov. 6, 1951 |
| 2,605,546 | Darcissac | Aug. 5, 1952 |